United States Patent [19]

Kuo

[11] Patent Number: 5,245,002
[45] Date of Patent: Sep. 14, 1993

[54] THERMOSETTING COATING COMPOSITIONS

[75] Inventor: Thauming Kuo, Kingsport, Tenn.

[73] Assignee: Eastman Kodak Company, Rochester, N.Y.

[21] Appl. No.: 883,079

[22] Filed: May 15, 1992

Related U.S. Application Data

[63] Continuation-in-part of Ser. No. 712,380, Jun. 10, 1991, abandoned.

[51] Int. Cl.$^5$ ............................................. C08G 63/00
[52] U.S. Cl. ................................. 528/176; 528/190; 528/192; 528/194; 528/100; 524/604
[58] Field of Search ............... 528/176, 190, 192, 194, 528/100; 524/604

[56] References Cited

U.S. PATENT DOCUMENTS

| | | | |
|---|---|---|---|
| 2,993,873 | 7/1961 | Heinrich et al. | 528/192 |
| 3,836,491 | 9/1974 | Taft et al. | 528/53 |
| 4,189,421 | 2/1980 | Shay et al. | 525/136 |
| 4,267,239 | 5/1981 | Thankachan et al. | 428/425.1 |
| 4,298,658 | 11/1981 | Thankachan et al. | 428/425.1 |
| 4,331,782 | 5/1982 | Linden | 525/173 |
| 4,331,783 | 5/1982 | Stoy | 525/294 |
| 4,340,718 | 7/1982 | Zannucci et al. | 528/128 |
| 4,343,839 | 8/1982 | Blegen | 427/340 |
| 4,355,133 | 10/1982 | East et al. | 524/604 |
| 4,405,764 | 9/1983 | Tobias et al. | 525/443 |
| 5,043,192 | 8/1991 | Jones et al. | 428/1 |

FOREIGN PATENT DOCUMENTS

| | | |
|---|---|---|
| 34919 | 9/1981 | European Pat. Off. |
| 419088 | 3/1991 | European Pat. Off. |
| 2266725 | 10/1975 | France |
| 50-040629A | 4/1975 | Japan |
| 51-044130A | 4/1976 | Japan |
| 51-056839A | 5/1976 | Japan |
| 52-073929 | 6/1977 | Japan |

OTHER PUBLICATIONS

Patent Abstract of Japan, vol. 14, No. 232 (C-719) (4175) May 17, 1990 and JP, A, 25 8 559 (Hitachi Chem. Co. Ltd.) Feb. 27, 1990.

Derwent Publication Ltd., London, GB; AN 90-103274 and JP, A, 2 053 881 (Towa Kasei Kogyo) Feb. 22, 1990.

*Primary Examiner*—John Kight, III
*Assistant Examiner*—Duc Truong
*Attorney, Agent, or Firm*—Bernard J. Graves, Jr.; William P. Heath, Jr.

[57] ABSTRACT

Provided are certain curable polyesters which are useful in enamel compositions. The enamel compositions provide coatings which exhibit superior hardness, impact resistance, acid resistance, and weatherability heretofore unachievable with other polyester based coatings.

18 Claims, No Drawings

THERMOSETTING COATING COMPOSITIONS

CROSS-REFERENCE TO RELATED APPLICATION

This application is a continuation in part of U.S. Ser. No. 07/712,380, filed June 10, 1991, now abandoned, incorporated herein by reference.

FIELD OF THE INVENTION

This invention belongs to the field of polymer chemistry. More particularly, this invention relates to acid resistant polyester coatings.

BACKGROUND OF THE INVENTION

There is a need in the coatings industry for high strength, high modulus, chemically resistant coatings. For high modulus, the coatings must exhibit exceptional hardness, while for high strength, they must have good resistance to impact. As to chemical resistance, it is particularly desirable for automotive coatings to have excellent acid etch resistance. This invention is directed toward the above objective. Crosslinkable polyester coatings resins are synthesized and formulated into industrial baking enamels from which surface coatings can be obtained, the cured films exhibiting a unique combination of hardness (pencil hardness >4H) and impact resistance (160 lb-in) as well as exceptionally high acid etch resistance.

It has been demonstrated that thermotropic liquid crystal polymers (LCPs) possess many advantages over conventional thermoplastics. The self reinforcement of the ordered polymeric molecules in the liquid crystalline (LC) state generally yield thermoplastics with exceptionally high strength and high modulus. In addition, LCPs have also been shown to have excellent solvent resistance, chemical resistance (e.g., acid, base, detergent), and weatherability. As described above, these properties are highly desirable in surface coatings. Recently coating scientists have attempted to apply the LCP technology to the coatings art.

U.S. Pat. No. 5,043,192 (Jones) discloses the application of liquid crystalline polyesters to the coatings industry, while displaying high hardness and high impact resistance. In one of the examples, linear oligoester diols were prepared and modified with p-hydroxybenzoic acid (PHBA) to yield LC oligoesters. The PHBA\diol mole ratio varied from 2.1/1 to 13/1. It was suggested that the excess of PHBA formed repeating p-oxybenzoyl LC segments in the oligoester chain ends. The resulting resins, however, were highly colored (i.e., brownish). The use of large quantities of the expensive raw material, PHBA, also made the resins commercially impractical.

European Patent Application No. 419088 discloses non liquid crystalline esterphenol capped liquid polymer and polyol compositions in combination with an amino cross-linking agent which provided films having superior properties. The resins were prepared by following a procedure similar to that of Jones at a lower reaction temperature (i.e., <200° C.) A PHB\ aliphatic hydroxyl equivalent ratio of 1/1 was used mostly, although it was suggested the ratio could be ranged from about 0.05 to about 1.25. This reference teaches that the coatings showed improved hardness and impact resistance. However, by repeating their examples we found the coatings did not exhibit high acid resistance.

Curable resin compositions modified with hydroxybenzoic acid had also been reported by others. U.S. Pat. No. 2,993,873 disclosed that drying times and coating properties of oil modified alkyd resins could be improved by replacing part of unsaturated fatty acids with hydroxybenzoic acid in the resin formulations. The coatings were cured by air dry or baking without the presence of a crosslinking agent. U.S. Pat. Nos. 4,267,239 and 4,298,658 describe the modification of alkyd resins with PHBA. The resulting resins could be rapidly cured at ambient temperatures with isocyanates in the presence of a tertiary amine vapor. U.S. Pat. Nos. 4,343,839 and 3,836,491 disclose a coating composition which is rapidly curable at room temperature in the presence of a tertiary amine catalyst vapor. The coating compositions were phenolic terminated polyesters and multi isocyanate curing agents. U.S. Pat. No. 4,331,7823 discloses the improved synthesis of a phenol functional polyester polymer which utilizes a preformed adduct of a hydroxybenzoic acid and an epoxy compound. Japanese patents Nos. 7540,629, 76 56,839, 76 44,130, and 787 73,929 disclose powder coating compositions containing phenolic hydroxy end groups. These resins had high softening points and were applied to the surface as powders.

In an effort to raise the softening point of the melamine type crosslinking agent for powder coatings, U.S. Pat. No. 4,189,421 taught the synthesis of solid addition products having a softening point above 100° F. by the reaction of a monohydroxy, single ring aromatic compound and a hexakis(alkoxymethyl)amino triazine ring (e.g., hexamethoxymethylmelamine, HMMM). They found the phenol compound not only could react with HMMM to form ether linkages (O-alkylation), but it could also form methylene bridges at the phenol ortho or para position (C-alkylation). The extent of both reactions was essentially equal. Further ring closure of the resulting product could also have occurred.

In the present invention, a smaller amount of PHBA was incorporated into the resins (i.e., about 15–16 mole %) to provide phenolic functionalities. Unlike the procedures described in both Jones' and Yezrlelev's (?) examples, no organic solvent was used for the synthesis of the resin. This feature allows the resins to be used in waterborne coating compositions. Further, this process is suitable for economical industrial production. In addition, I have discovered that when 1,4-cyclohexanedicarboxylic acid (1,4-CHDA) was used in the resin formulations together with p-hydroxybenzoic acid (PHBA), while in the absence of aromatic diacids, the coatings exhibited superior weatherability over other phenolic-functional or conventional polyester resins, while maintaining other desirable coating properties.

A branching agent, trimethylolpropane(TMP), was also incorporated into the resins which provided higher crosslink density. Further, I have discovered that the presence of TMP, a trifunctional compound, is required in order to yield higher molecular weight resins containing PHBA. Ostensibly, because the phenolic groups are not reactive under the conditions employed for resin synthesis, PHBA should be viewed as a monofunctional monomer which could terminate the polymer chain growth. I found that a triol such as TMP helps to propagate the growth of the polymer chain and affords surprisingly higher molecular weight resins; the coatings made possible by this discovery have strikingly better properties. This effect was found to be especially significant when PHBA was reacted with an excess of TMP only in the first stage of the resin synthesis as described below in Example 8. In this example, the carboxyl group of PHBA was capped by TMP to form a diol adduct in the first stage. The diol adduct was then polymerized with other diols and diacids in the second stage without causing the problem of decarboxylation of PHBA. The resulting resin had a number average molecular weight of 3200 which was much higher than other resins containing a similar ratio of PHBA. Finally, attempts at end capping the reins with PHBA in the final stage of the reaction were unsuccessful in providing resins with higher molecular weight—these attempts resulted in significant PHBA sublimation as well as degradation of the polymer chain due ostensibly to ester interchange reactions.

SUMMARY OF THE INVENTION

The present invention provides oil free polyester resin compositions containing phenolic functional groups which are prepared by a direct polycondensation process which is suitable for economical, large sale production. The phenolic functional resins thus produced are useful as coatings binders and thus may be dissolved in conventional solvents and formulated into thermosetting coating compositions which exhibit an extraordinary combination of pencil hardness and impact resistance as well as good acid resistance and weatherability. As noted below, substantially all of the hydroxy acid residues exist at the ends of the curable polyester chain, i.e., >90%. As used herein, the term "acid resistance" is intended to mean coatings which show very little degradative effect after exposure to 50% $H_2SO_4$ for 24 hours and whose free standing films do not decompose in concentrated $H_2SO_4$ over a period of at least 30 minutes. As used herein, the term "weatherability" is intended to mean coatings which show a 60°/20° gloss retention of at least 70/50, respectively, after 1000 hours of Carbon Arc accellerated weathering and at least 90/ 80 after 1000 hours of QUV accellerated weathering as per these testing methods as described in the Experimental Section below. Accordingly, these coatings compositions are especially useful for applications where extreme environmental impact may be expected, e.g., automobile body exteriors.

DETAILED DESCRIPTION OF THE INVENTION

The present invention provides a curable polyester having a number average molecular weight of about 800 to about 3000 and a weight average molecular weight of about 3000 to about 40,000, comprising (a) about 35 to about 45 mole percent of diol residues, based on the total moles of (a), (b), (c), (d) and (e);

(b) about 4 to about 8 mole percent of triol residues, based on the total moles of (a), (b), (c), (d) and (e); (c) about 0 to about 16 mole percent, based on the total moles of (a), (b), (c), (d) and (e), of residues of a linear aliphatic diacid;

(d) about 24 to about 40 mole percent of 1,3-and/or 1,4 cylohexanedicarboxylic acid residues based on the total moles of (a), (b), (c), (d) and (e); (e)

about 12 to about 20 mole percent, based on the total moles of (a), (b), (c), (d) and (e), of hydroxy acid residues selected from residues of

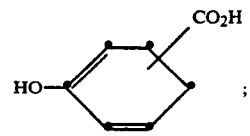

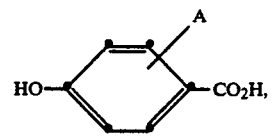

wherein A is halogen, $C_1$-$C_6$ alkyl, or phenyl;

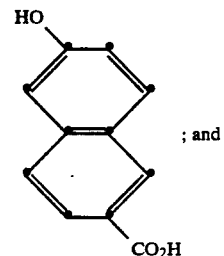

; and

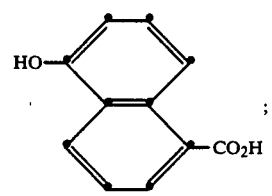

;

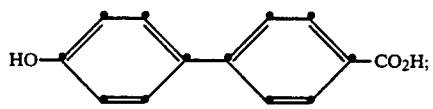

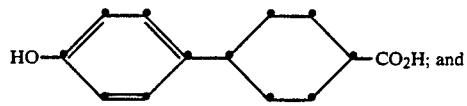

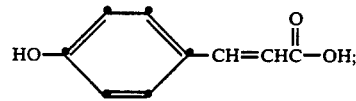

wherein substantially all of said hydroxy acid residues are located at the ends of the polymer chains to which they are attached.

As a further preferred embodiment of the present invention, there is provided a curable polyester having a number average molecular weight of about 800 to about 3000 and a weight average molecular weight of about 3000 to about 40,000, comprising (a) about 38 to about 42 mole percent of diol residues, based on the total moles of (a), (b), (c), (d) and (e);

(b) about 5 to about 7 mole percent of triol residues, based on the total moles of (a), (b), (c), (d) and (e);

(c) about 6 to about 10 mole percent, based on the total moles of (a), (b), (c), (d) and (e), of residues of a linear aliphatic diacid;

(d) about 30 to about 34 mole percent of 1,3-and/or 1,4 cylohexanedicarboxylic acid residues based on the total moles of (a), (b), (c), (d) and (e);

(e) about 14 to about 18 mole percent, based on the total moles of (a), (b), (c), (d) and (e), of hydroxy acid residues of the formula

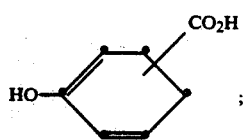

wherein substantially all of said hydroxy acid residues are located at the ends of the polymer chains to which they are attached.

As a further preferred embodiment of the present invention, there is provided a curable polyester having a number average molecular weight of about 800 to about 0 and a weight average molecular weight of about 3000 to about 40,000, comprising (a) about 38 to about 42 mole percent of diol residues, based on the total moles of (a), (b), (c), and (d);

(b) about 5 to about 7 mole percent of triol residues, based on the total moles of (a), (b), (c), and (d);

(c) about 38 to about 42 mole percent of 1,3-and/or 1,4 -cylohexanedicarboxylic acid residues based on the total moles of (a), (b), (c), and (d);

(d) about 14 to about 18 mole percent, based on the total moles of (a), (b), (c), and (d); of

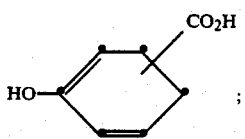

wherein substantially all of said hydroxy acid residues are located at the ends of the polymer chains to which they are attached.

As noted above, these curable polyesters are useful in preparing thermosetting coating compositions. Thus, as a further aspect of this invention, there is provided a curable enamel composition which when applied to a substrate and cured provides a coating having a pencil hardness of greater than 4H, an impact resistance of hardness of greater than 140 lb.-in., and being substantially resistant to acidic corrosion and weathering, said composition comprising (I) 15 to about 40 weight percent of a curable polyester having a number average molecular weight of about 800 to about 3000 and a weight average molecular weight of about 3000 to about 40,000 comprising (a) at least 30 mole percent of diol residues, based on the total moles of (a), (b), (c), (d), and (e); (b) about 0 to about 9 mole percent of triol residues, based on the total moles of (a), (b), (c), (d), and (e);

(c) about 0 to about 35 mole percent, based on the total moles of (a), (b), (c), (d), and (e), of residues of an aliphatic diacid;

(d) about 5 to about 50 mole percent of 1,3-and/or 1,4 cyclohexanedicarboxylic acid residues based on the total moles of (a), (b), (c), (d), and (e);

(e) about 12 to about 20 mole percent, based on the total moles of (a), (b), (c), (d) and (e) of hydroxy acid residues selected from residues of

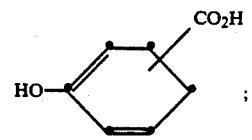

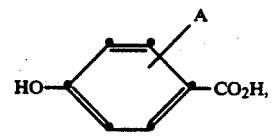

wherein A is halogen, $C_1$-$C_6$ alkyl; or phenyl;

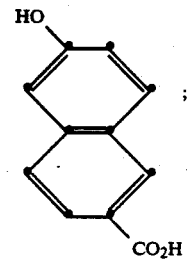

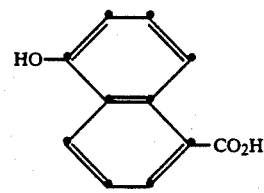

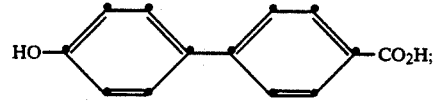

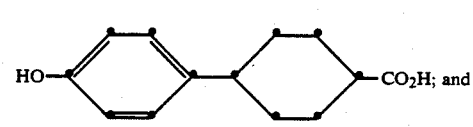

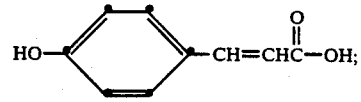

wherein substantially all of said hydroxy acid residues are located at the ends of the polymer chains to which they are attached;

(II) about 10 to about 50 weight percent of a solvent; and (III) about 5 to about 20 weight percent of a cross-linking agent.

As a further aspect of the present invention, there is provided a water borne enamel composition, which is produced by modifiying the above curable polyesters with a polybasic acid in order to increase the acid number above 40. The resulting modified polyester is then neutralized with an amine and dispersed in water. The water borne compositions are further described below in the Experimental Section.

As a further aspect of the present invention, there is provided a condensation process for preparing high molecular weight curable polyesters, said polyesters comprising (1) about 4 to about 8 mole percent of triol residues; and (2) about 12 to about 20 mole percent of hydroxy acid residues selected from residues of

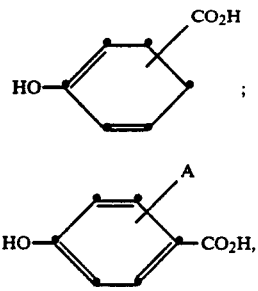

wherein A is halogen, $C_1$-$C_6$ alkyl, or phenyl;

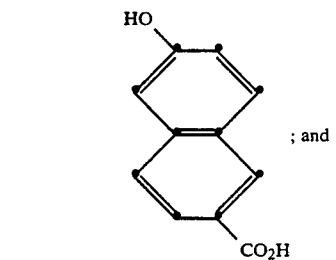

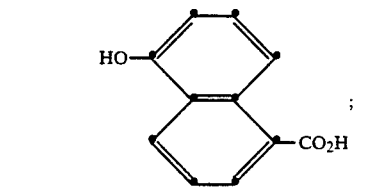

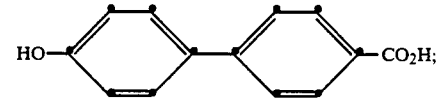

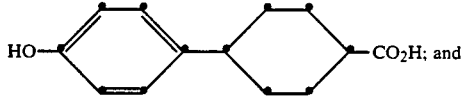

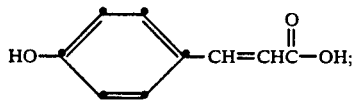

wherein substantially all of said hydroxy acid residues are located at the ends of the polymer chains to which they are attached;

which comprises combining component (1) triol with component (2) hydroxy acids in the presence of a condensation catalyst, followed by heating to a temperature sufficient to induce condensation, followed by addition of remaining diol and dicarboxylic acid components followed by continued heating until said condensation is substantially complete.

As a preferred embodiment of this aspect of the present invention, there is provided a process for preparing a curable polyester having a number average molecular weight of about 800 to about 3500 and a weight average molecular weight of about 3000 to about 70,000, comprising (a) about 35 to about 45 mole percent of diol residues, based on the total moles of (a), (b), (c), (d) and (e);

(b) about 4 to about 8 mole percent of triol residues, based on the total moles of (a), (b), (c), (d) and (e);

(c) about 0 to about 16 mole percent, based on the total moles of (a), (b), (c), (d) and (e), of residues of a linear aliphatic diacid;

(d) about 24 to about 40 mole percent of 1,3-and/or 1,4 cylohexanedicarboxylic acid residues based on the total moles of (a), (b), (c), (d) and (e);

(e) about 12 to about 20 mole percent, based on the total moles of (a), (b), (c), (d) and (e), of hydroxy acid residues selected from residues of

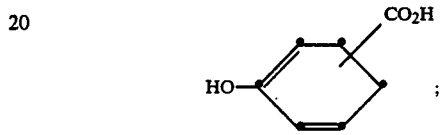

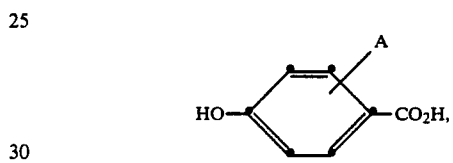

wherein A is halogen, $C_1$-$C_6$ alkyl, or phenyl;

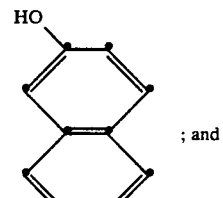

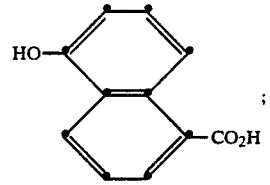

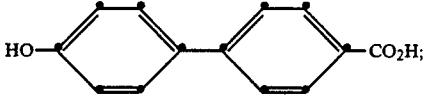

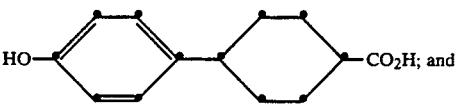

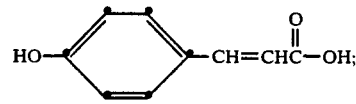

wherein substantially all of said hydroxy acid residues are located at the ends of the polymer chains to which they are attached; which comprises combining component (b) triol with component (e) in the presence of a condensation catalyst, followed by heating to a temperature sufficient to induce condensation, followed by addition of components (a), (c), and (d), followed by continued heating until said condensation is substantially complete.

In the processes and curable polyesters described herein, preferred diols are chosen from ethylene glycol; propylene glycol; 1,3-propanediol; 2,4-dimethyl-2-ethylhexane-1,3 diol; 2,2-dimethyl-1,3-propanediol; 2-ethyl-2-butyl-1,3 propanediol; 2-ethyl-2-isobutyl-1,3-propanediol; 1,3-butanediol; 1,4-butanediol; 1,5-pentanediol, 1,6-hexanediol; 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols. The most highly preferred diol is 2,2-dimethyl-1,3-propanediol.

Preferred triols include trimethylolpropane, trimethylolethane, glycerol, and the like. Trimethylolpropane is the most highly preferred triol.

The curable polyesters provided herein preferably have an acid number of not greater than 80 and a hydroxyl number of at least 50.

It should be appreciated that lower alkyl, i.e., $C_1$–$C_6$ alkyl, esters can be utilized in the above direct polycondensation, and in such an instance, the by-product of the condensation will be a lower ($C_1$–$C_6$) alcohol.

Suitable solvents for the curable enamel composition include xylenes, cyclohexanone, ketones, (for example, methyl amyl ketone), 2-butoxyethanol, ethyl-3-ethoxypropionate, toluene, n-butanol, and other volatile inert solvents typically used in industrial baking (i.e., thermosetting) enamels. It should also be appreciated that the water-borne enamel compositions generally contain about 0 to about 10 of one or more water-miscible organic solvents.

The cross-linking agent is preferably a melamine-type cross-linking agent, i.e., a cross-linking agent having a plurality of —N(CH$_2$OR$^3$)$_2$ functional groups, wherein R$^3$ is $C_1$–$C_4$ alkyl, preferably methyl.

In general, the cross-linking agent may be selected from compounds of the following formulae, wherein R$^3$ is independently $C_1$–$C_4$ alkyl:

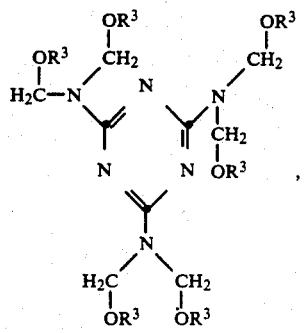

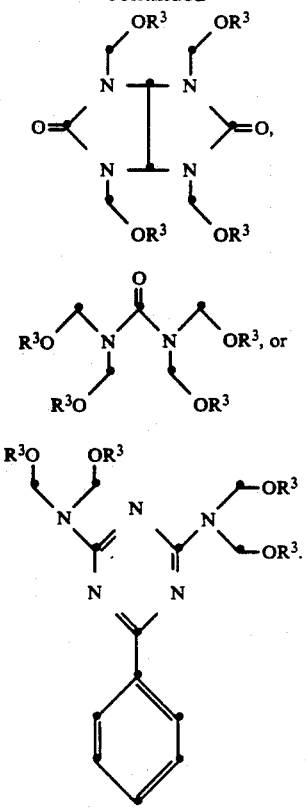

In this regard, preferred cross-linking agents include hexamethoxymethylmelamine, tetramethoxymethylbenzoguanamine, tetramethoxymethylurea, mixed butoxy/methoxy substituted melamines, and the like. The most preferred cross-linking agent is hexamethoxymethylmelamine.

As a further aspect of the present invention, there is provided a curable enamel composition further comprising one or more cross-linking catalysts. The most preferred cross-linking catalyst for melamine type cross-linking agents is p-toluenesulfonic acid.

As a further aspect of the present invention there is provided a cross linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti settling, anti sag and bodying agents; anti skinning agents; anti flooding and anti floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID ®; polypropylene, available from Hercules Inc., under the trademark HERCOFLAT ®; synthetic silicate, available from J. M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N (1,2-dicarboxy ethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the tradename Brubreak of Buckman Laboratories Inc., under the BYK ® trademark of BYK Chemie, U.S.A., under the FOAMASTER ® and NOPCO ® trademarks of Henkel Corp./Coating Chemicals, under the DREWPLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4-dimethyloxazolidine, 3,4,4-trimethyloxazolidine, midified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trademark CYASORB UV, and available from Ciba Geigy under the trademark TINUVIN, and diethyl-3-acetyl-4-hydroxy benzyl phonsphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above described additives, further comprising one or more pigments.

Pigments suitable for use in the enamel compositions envisioned by the present invention are the typical organic and inorganic pigments, well known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101(red iron oxide); CI Pigment Yellow 42, CI Pigment Blue 15, 15:1, 15:2, 15:3, 15:4 (copper phthalocyanines); CI Pigment Red 49:1, and CI pigment Red 57:1.

Upon formulation above, the curable enamel composition is then applied to the desired substrate or article, e.g., steel, aluminum, or galvanized sheeting (either primed or unprimed), heated (i.e., cured) to a temperature of about 140° C. to about 175° C., for a time period of 5-60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

EXPERIMENTAL SECTION

All of the curable polyester resins were formulated to be hydroxyl terminated. In addition to the free aliphatic hydroxyl groups, the resins also contained phenolic hydroxyl end groups. Acid numbers could not be correctly determined by ASTM Method D465, because of the presence of acidic phenolic end groups. A potentiometric titration method was used to determine the acid number and phenolic hydroxyl number of resins 1 and 2. Molecular weights were estimated by Gel Permeation Chromatography and viscosities were measured by an ICI Cone and Plate Viscometer at 150° C. The thermotransition temperatures were recorded on a Differential Scanning Calorimeter (DSC).

EXAMPLE 1, PREPARATION OF RESIN 1

To a three neck round bottom flask equipped with a mechanical stirrer, a steam partial condenser, a Dean-Stark trap, and a water condenser were charged the following reactants: NPG 67.66 g (0.65 mole), TMP 15.14 g (0.11 mole), CHDA 45.89 g (0.27 mole), PHBA 36.83 g (0.27 mole), and the catalyst, FASCAT 4100, 0.2 g. The mixture was heated to 150° C. and stirred under $N_2$ atmosphere. The temperature was then gradually increased to 220° C. in a period of two hours and the distillate was collected in the Dean Stark trap. When the collection of the distillate stopped (two more hours), indicating the first stage reaction was almost complete, CHDA 45.89 g (0.27 mole) and AD 20.42 g (0.14 mole) were then added. After stirring for nine more hours, a total of 29 ml of the distillate ($H_2O$) was collected. The resulting resin was poured into a metal container and cooled to room temperature (rt).

Aliphatic AD is usually used in resin formulations together with aromatic diacids to increase the flexibility of the resins. In Example I, however, CHDA can also provide the resin with good flexibility due to its aliphatic structure, so AD may not be needed. Example 2 describes the preparation of a resin containing no acyclic diacids.

EXAMPLE 2. PREPARATION OF RESIN 2

To a three neck round bottom flask equipped with a mechanical stirrer, a steam partial condenser, a Dean-Stark trap, and a water condenser were charged the following reactants: NPG 67.66 g (0.65 mole), TMP 15.14 g (0.11 mole), CHDA 57.78 g (0.34 mole), PHBA 36.83 g (0.27 mole), and the catalyst, Fascat 4100, 0.2 g. The mixture was heated to 150° C. and stirred under $N_2$ atmosphere. The temperature was then gradually increased to 220° C. in a period of 2.5 hours and the distillate was collected in the Dean Stark trap. When the collection of the distillate stopped (two more hours), indicating the first stage reaction was almost complete, CHDA 57.78 g (0.34 mole) was then added. After stirring for nine more hours, a total of 29 ml of the distillate ($H_2O$) was collected. The resulting resin was poured into a metal container and cooled to rt.

It should also be interesting to see the effect on the resin and coating properties by replacing part of CHDA in example 1 and 2 with TPA. Example 3 represents the synthesis of one of such resins.

EXAMPLE 3. PREPARATION OF RESIN 3

To a three-neck round bottom flask equipped with a mechanical stirrer, a steam partial-condenser, a Dean-Stark trap, and a water condenser were charged the following reactants: NPG 72.66 g (0.70 mole), TMP 15.14 g (0.11 mole), TPA 80.68 g (0.49 mole), PHBA 36.83 g (0.27 mole), and the catalyst, Fascat 4100, 0.2 g. The mixture was heated to 150° C. and stirred under $N_2$ atmosphere. The temperature was then gradually increased to 220° C. in a period of two hours and the distillate was collected in the Dean-Stark trap. When the collection of the distillate stopped (two more hours), indicating the first stage reaction was almost complete, CHDA 24.82 g (0.15 mole) was then added. After stirring for seven more hours, a total of 29 ml of the distillate ($H_2O$) was collected. The resulting resin was poured into a metal container and cooled to rt.

In order to demonstrate the superior properties of phenolic-functional CHDA resins, three polyester resins containing no phenolic-functional groups were prepared as the controls. The compositions of the three phenolic functional resins and the controls are listed below:
Resin 1: NPG/TMP/AD/CHDA/PHBA=38/6/8/32/16% by mole
Resin 2: NPG/TMP/CHDA/PHBA=38/6/40/16
Resin 3: NPG/TMP/TPA/CHDA/PHBA=41/6/28/9/16
Control 1: NPG/TMP/AD/CHDA=45/8/19/28
Control 2: NPG/TMP/AD/CHDA/TPA=45/8/10/28/10
Control 3: NPG/TMP/IPA/CHDA/TPA=58/3/12/24/4

Control 1 is an all aliphatic resin. Control 2 contains a low percentage of an aromatic component (TPA), which is comparable to the aromatic content (PHBA) in resin 1 and 2. Control 3 is a high solids resin formulation containing CHDA, which exhibits better weatherability than other common polyester resins. The procedures for the synthesis of these control resins are shown in Example 4, 5, and 6.

EXAMPLE 4. PREPARATION OF CONTROL 1

To a three-neck round bottom flask equipped with a mechanical stirrer, a steam partial-condenser, a Dean-Stark trap, and a water condenser were charged the following reactants: NPG 67.66 g (0.65 mole), TMP 15.14 g (0.11 mole), CHDA 68.00 g (0.40 mole), AD 40.83 g (0.28 mole), and the catalyst, Fascat 4100, 0.2 g. The mixture was heated to 150° C. and stirred under $N_2$ atmosphere. The temperature was then gradually increased to 220° C. in a period of 2.5 hours and the distillate was collected in the Dean-Stark trap. After stirring for 1.5 more hours, a total of 24.5 ml of the distillate ($H_2O$) was collected. The resulting resin was poured into a metal container and cooled to rt.

EXAMPLE 5. PREPARATION OF CONTROL 2

To a three-neck round bottom flask equipped with a mechanical stirrer, a steam partial-condenser, a Dean-Stark trap, and a water condenser were charged the following reactants: NPG 67.66 g (0.65 mole), TMP 15.14 g (0.11 mole), CHDA S34.00 g (0.20 mole), TPA 23.68 g (0.14 mole), and the catalyst, Fascat 4100, 0.2 g. The mixture was heated to 150° C. and stirred under $N_2$ atmosphere. The temperature was then gradually increased to 220° C. in a period of two hours and the distillate was collected in the Dean-Stark trap. When the collection of the distillate stopped (1.5 more hours), indicating the first stage reaction was almost complete, CHDA 34.00 g (0.20 mole) and AD 20.42 g (0.14 mole) were then added. After stirring for two more hours, a total of 24 ml of the distillate ($H_2O$) was collected. The resulting resin was poured into a metal container and cooled to rt.

EXAMPLE 6. PREPARATION OF CONTROL 3

To a three-neck round bottom flask equipped with a mechanical stirrer, a steam partial-condenser, a Dean-Stark trap, and a water condenser were charged the following reactants: NPG 154.6 g (1.49 mole), IPA 50.2 g (0.30 mole), and TPA 16.8 g (0.10 mole). The mixture was heated to 150° C. and stirred under $N_2$ atmosphere. The temperature was then gradually increased to 220° C. and the distillate was collected in the Dean-Stark trap. After stirring for four hours, the second-stage reactants, TMP 5.2 g (0.04 mole) and CHDA 104.2 g (0.61 mole), were added. The reaction was then continued for one more hour, followed by the addition of more TMP 5.2 g (0.04 mole). The reaction was stopped after stirring for two more hours. A total of 35 ml of the distillate was obtained. The resulting resin was poured into a metal container and cooled to rt.

The properties of the phenolic-functional resins and the controls are collected in Table I and II.

TABLE I

| Properties of Phenolic-Functional Resins | | | |
|---|---|---|---|
| Resin | Resin 1 | Resin 2 | Resin 3 |
| Acid Number | 11 | 11 | — |
| Phenolic Hydroxyl No. | 63 | 64 | — |
| Mn* | 1500 | 1500 | 1900 |
| Mw** | 6100 | 6900 | 7100 |
| tg, °C. | 12 | 24 | 46 |

TABLE II

| Properties of Control Resins | | | |
|---|---|---|---|
| Resin | Control 1 | Control 2 | Control 3 |
| Acid Number | 12 | 8 | 12 |
| Mn* | 6000 | 3800 | 900 |
| MW** | 30000 | 18000 | 1400 |

TABLE II-continued

Properties of Control Resins

| Resin | Control 1 | Control 2 | Control 3 |
|---|---|---|---|
| tg, °C | −18 | 6 | 30 |

*number average molecular weight
**weight average molecular weight

The resins can be dissolved in a solvent mixture (e.g. xylene/MAK/EEP/n-BuOH or MAK/EEP/n-BuOH) and formulated into industrial baking enamels as described in the following:

EXAMPLE 7. PREPARATION OF WHITE ENAMELS

The resin (20 g) was dissolved in 20–40 ml of a solvent mixture (55% xylene, 32% MAK (methyl n-amyl) ketone), 6.5% EEP (ethyl 3-ethoxypropionate), and 6.5% BuOH by weight). To this solution were added $TiO_2$ (Du Pont R-900, 20 g), the crosslinker, hexamethoxymethylmelamine (HMMM, Cymel 303, 8 g), the acid catalyst (40% p-toluenesulfonic acid in i-PrOH, 0.2–0.4 g) and the fluorocarbon flow control additive (20% Fluorad FC-430 in i-PrOH, 0.3 g). The mixture was stirred in a Waring blender for 5 min. A white enamel was obtained. (Resin:HMMM=about 70:30)

The enamels were applied to cold-rolled steel test panels and baked at 175° C. for 20 min. The film thickness was about 1.0–1.5 mil. The coating properties are collected in Table III and IV. The coating testings were carried out according to the following standard methods:

1. Film Thickness (Fisher Deltascope MP2, ASTM B499)
2. Gloss (ASTM D523)
3. Hardness (Pencil Method, ASTM D3363)
4. Impact Resistance (BYK -Gardner Impact Tester, ASTM D2794)
5. Solvent Resistance (ASTM D1308)
6. Cleveland Humidity (ASTM D2247)
7. UV Accelerated Weathering (ASTM G-53)
8. Carbon-Arc Accelerated Weathering (ASTM D822 with Corex glass filter)

TABLE III

| Resin | Coating Properties | | |
|---|---|---|---|
| | Resin 1 | Resin 2 | Resin 3 |
| Gloss, 60°/20° | 94/84 | 95/85 | 99/92 |
| Pencil Hardness | 4H | 4H | 5H |
| Impact Resistance direct/reverse (lb-in) | 160/160 | 160/160 | 160/160 |
| MEK Double Rub | >200 | >200 | >200 |
| Chemical Resistance | | | |
| 50% $H_2SO_4$, 24 hr | 1 | 1 | 1 |
| film in conc. $H_2SO_4$, time to decomposition | 1 hr | 1 hr | 2 hr |
| 50% NaOH, 24 hr | 1 | 1 | 1 |
| Stain Resistance Iodine, 30 min | 4 | 4 | 1 |
| Weatherability % gloss retention, 60/20° | | | |
| Carbon Arc, 1000 hr. | 82/60 | 79/54 | 27/3 |
| QUV, 1000 hr. | 95/84 | 97/84 | 62/34 |

1: no effect, 2: very slight effect, 3: slight effect, 4: moderate effect, 5: considerable effect, 6: severe effect

TABLE IV

| Resin | Coating Properties | | |
|---|---|---|---|
| | Control 1 | Control 2 | Control 3 |
| Gloss, 60°/20° | 75/55 | 88/72 | 96/83 |
| Pencil Hardness | F | 3H | 4H |
| Impact Resistance direct/reverse (lb-in) | 160/160 | 160/160 | 140/120 |
| MEK Double Rub | >200 | >200 | >200 |
| Chemical Resistance | | | |
| 50% $H_2SO_4$, 24 hr | 6 | 6 | 5 |
| film in conc. $H_2SO_4$, time to decomposition | <5 min. | <5 min. | <5 min. |
| 50% NaOH, 24 hr | 1 | 1 | 1 |
| Stain Resistance Iodine, 30 min | 6 | 5 | 2 |
| Weatherability % gloss retention, 60/20° | | | |
| Carbon Arc, 1000 hr. | 12/4 | 51/18 | 54/12 |
| QUV, 1000 hr. | 20/4 | 92/73 | 98/91 |

1: no effect, 2: very slight effect, 3: slight effect, 4: moderate effect, 5: considerable effect, 6: severe effect As illustrated in Table III and IV, resin 3 which contains both aromatic and cycloaliphatic diacids (TPA & CHDA) does not show improved weatherability. However, resin 1 and 2 which do not contain aromatic diacids exhibit excellent weatherability. They are much better than the controls as shown by the Carbon Arc accelerated weathering test. It is surprising the aromatic character of PHBA in resin 1 and 2 does not affect the weatherability. In fact, when PHBA is the only aromatic content in the resins, the coatings show the best weatherability. It should also be noted the presence of AD in resin 1 does not affect the weatherability as compared to that of resin 2. As a result, resin 1 and 2 are suitable for application in coatings which require good weatherability.

In addition to having excellent weatherability, the coatings of the present invention are also superior to the controls in almost all the categories, especially acid resistance. Free standing coating films of each resins were immersed into concentrated sulfuric acid. While the controls decomposed immediately, the films of the present invention remained intact for more than one hour. Cleveland humidity test was carried out on resin 1, which showed no change after 1500 hr. It was also found that clear coatings of the present invention exhibit exceptionally high gloss (e.g. 60/20° C. gloss=101/100). These improved properties enable CHDA phenolic-funtional resins to be especially useful for automotive topcoats.

In Example 8 below, PHBA was reacted with an excess of TMP in the first stage of the reaction, so that the monofunctional nature of PHBA would not terminate the polymer chains. As a result, Resin 4 and a higher moleular weight (i.e., Mn=1800, Mw=19,000). In addition, the reaction time was shorter. The resulting resin was yellowish in color; however, it was found that if a color stabilizer (e.g., WESTON 618, Borg-Warner Chemicals, Inc., 0.2 g) was added to the reaction mixture, the resulting resin is almost colorless.

EXAMPLE 8. PREPARATION OF RESIN 4

To a three-neck round bottom flask equipped with a mechanical stirrer, a steam partial-condenser, a Dean-Stark trap, and a water condenser were charged the following reactants: TMP 30.28 g (0.23 mole), PHBA 36.83 g (0.27 mole), and the catalyst, FASCAT 4100 0.2 g. The mixture was heated to 150° C. and stirred under $N_2$ atmosphere. The temperature was then gradually increased to 220° C. in a period of 0.5 hour and the distillate was collected in the Dean-Stark trap. When the collection of the distillate stopped (one more hour), indicating the first stage reaction was almost complete, NPG 55.50 g (0.53 mole), AD 20.42 g (0.14 mole), and 1,4-cyclohexanedicarboxylic acid 91.78 g (0.54 mole) were then added. The reaction was complete after stirring for 4.5 more hours. The resulting viscous resin was collected in a metal container and cooled to room temperature.

EXAMPLE 9—PREPARATION OF WATER-BORNE ENAMEL COMPOSITION

Resin 1 or 2 (40 g) is heated to 180° C. and stirred in a round-bottom flask equipped with a water condenser. Trimellitic anhydride (1 g) is then added to the above resin and stirred for 30 minutes. After the mixture is cooled to 80° C., a co-solvent, ethylene glycol monobutyl ether (10 g) is added, followed by DMAE (1.5 g). The resulting viscous solution was then dispersed in distilled water (60 g) at 50° C. The water dispersion is subsequently transferred to a blender and mixed with CYMEL 303 (16 g), TiO$_2$ (40 g), and FLOURAD FC 430 (20% in isopropanol, 0.6 g) to provide a water-borne white enamel.

I claim:

1. A curable enamel composition which when applied to a substrate and cured provides a coating having a pencil hardness of greater than 4H, an impact resistance of greater than 140 lb.-in., and being substantially resistant to acidic corrosion and weathering, said composition comprising (I) 15 to about 40 weight percent of a curable polyester having a number average molecular weight of about 800 to about 3000 and a weight average molecular weight of about 3000 to about 40,000 comprising (a) about 35 to about 45 mole percent of diol residues, based on the total moles of (a), (b), (c), (d), and (e);

(b) about 4 to about 8 mole percent of polyol residues, based on the total moles of (a), (b), (c), (d), and (e);

(c) about 0 to about 16 mole percent, based on the total moles of (a), (b), (c), (d), and (e), of residues of an aliphatic diacid;

(d) about 24 to about 40 mole percent of 1,3- and/or 1,4-cyclohexanedicarboxylic acid residues based on the total moles of (a), (b), (c), (d), and (e);

(e) about 12 to about 20 mole percent, based on the total moles of (a), (b), (c), (d) and (e) of hydroxy acid residues selected from residues of

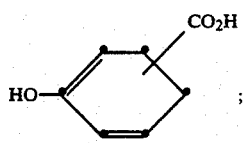

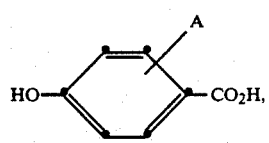

wherein A is halogen, C$_1$-C$_6$ alkyl; or phenyl;

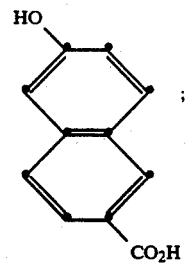

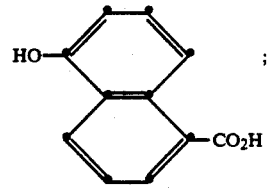

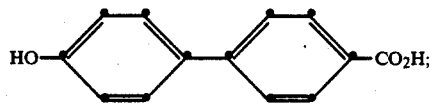

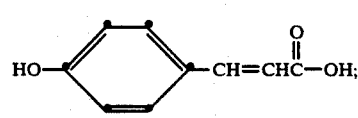

wherein substantially all of said hydroxy acid residues are located at the ends of the polymer chains to which they are attached;

(II) about 10 to about 50 weight percent of a solvent; and (III) about 5 to about 20 weight percent of a crosslinking agent.

2. The curable enamel composition of claim 1, wherein component (a) diol residues are selected from residues of

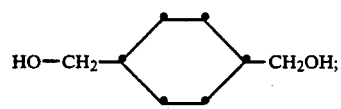

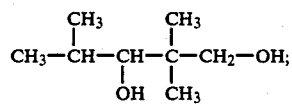

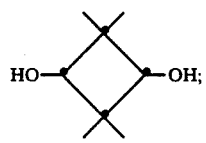

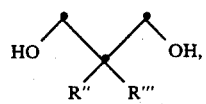

wherein R″ and R‴ are individually C$_1$–C$_8$ alkyl; and

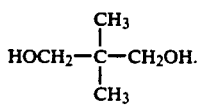

3. The enamel composition of claim 1, wherein component (b) triol residues are selected from residues of trimethylolpropane, trimethylolethane, and glycerol.

4. The enamel composition of claim 1 wherein the component (a) diol residue is comprised of a residue of the formula

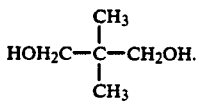

5. The enamel composition of claim 1, wherein the component (b) triol residue is comprised of trimethylolpropane residues.

6. The enamel composition of claim 1, wherein the hydroxy acid residue is a residue of a compound of the formula

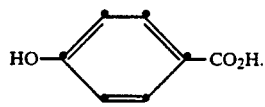

7. The enamel composition of claim 1, wherein the component (a) diol residues are comprised of a residue of the formula

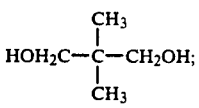

component (b) triol residues are comprised of trimethylolpropane residues;
component (c) aliphatic diacid residues are comprised of adipic acid residues; and
component (e) hydroxy acid residues are comprised of residues of

8. A curable enamel composition which when applied to a substrate and cured provides a coating having a pencil hardness of greater than 4H, an impact resistance of greater than 140 lb.-in., and being substantially resistant to acidic corrosion and weathering, said composition comprising
(I) 15 to about 40 percent of a curable polyester having a number average molecular weight of about 800 to about 3000 and a weight average molecular weight of about 3000 to about 40,000 comprising
(a) about 38 to about 42 mole percent of diol residues, based on the total moles of (a), (b), (c), (d) and (e);
(b) about 5 to about 7 mole percent of triol residues, based on the total moles of (a), (b), (c), (d) and (e);
(c) about 6 to about 10 mole percent, based on the total moles of (a), (b), (c), (d) and (e), of residues of a linear aliphatic diacid;
(d) about 30 to 34 mole percent of 1,4-cylohexanedicarboxylic acid residues based on the total moles of (a), (b), (c), (d) and (e);
(e) about 14 to about 18 mole percent, based on the total moles of (a), (b), (c), (d) and (e), of hydroxy acid residues of the formula

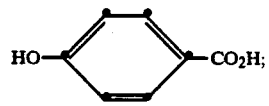

wherein substantially all of said hydroxy acid residues are located at the ends of the polymer chains to which they are attached;
(II) about 10 to about 50 weight percent of a solvent; and
(III) about 5 to about 20 weight percent of a cross linking agent.

9. A curable enamel composition which when applied to a substrate and cured provides a coating having a pencil hardness of greater than 4H, an impact resistance of greater than 140 lb.-in., and being substantially resistant to acidic corrosion, said composition comprising
(I) 15 to about 40 weight percent of a curable polyester having a number average molecular weight of about 800 to about 3000 and a weight average molecular weight of about 3000 to about 40,000 comprising
(a) about 38 to about 42 mole percent of diol residues, based on the total moles of (a), (b), (c), and (d);
(b) about 5 to about 7 mole percent of triol residues, based on the total moles of (a), (b), (c), and (d);
(c) about 38 to about 42 mole percent of 1,4-cylohexanedicarboxylic acid residues based on the total moles of (a), (b), (c), and (d);
(d) about 14 to about 18 mole percent, based on the total moles of (a), (b), (c), and (d); of hydroxy acid residues of the formula

wherein substantially all of said hydroxy acid residues are located at the ends of the polymer chains to which they are attached;
(II) about 10 to about 50 weight percent of a solvent; and
(III) about 5 to about 20 weight percent of a cross linking agent.

10. A shaped or formed article coated with the cured enamel composition of claim 1.

11. An auto body or body part coated with the cured enamel composition of claim 1.

12. The curable enamel composition of claim 1 further comprising one or more leveling, rheology, and flow control agents; flatting agents; pigment wetting and dispersing agents and surfactants; ultraviolet absorbers; ultraviolet light stabilizers; tinting pigments; defoaming and anti-foaming agents; anti-settling, anti-sag and bodying agents; anti-skinning agents; anti-flooding and anti-floating agents; fungicides and mildewicides; corrosion inhibitors; thickening agents; or coalescing agents.

13. The composition of claim 1, further comprising one or more pigments.

14. A water borne enamel composition which comprises (I) 25 to about 65 weight percent of a curable polyester having a number average molecular weight of about 800 to about 3000 and a weight average molecular weight of about 3000 to about 40,000, comprising (a) about 35 to about 45 mole percent of diol residues, based on the total moles of (a), (b), (c), (d), and (e);

(b) about 4 to about 8 mole percent of polyol residues, based on the total moles of (a), (b), (c), (d), and (e);

(c) about 0 to about 16 mole percent, based on the total moles of (a), (b), (c), (d), and (e), of residues of a linear aliphatic diacid;

(d) about 24 to about 40 mole percent of 1,4-cyclohexanedicarboxylic acid residues based on the total moles of (a), (b), (c), (d), and (d);

(e) about 12 to about 20 mole percent, based on the total moles of (a), (b), (c), (d) and (e) of hydroxy acid residues selected from residues of

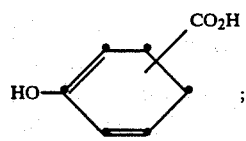

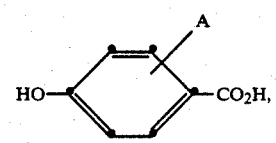

wherein A is halogen, $C_1$–$C_6$ alkyl, or phenyl;

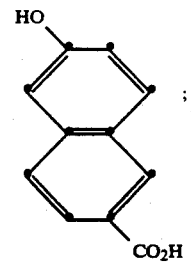

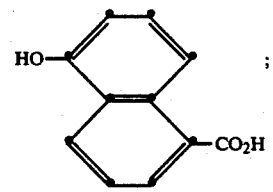

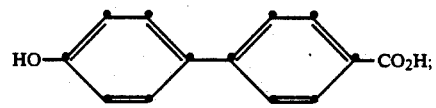

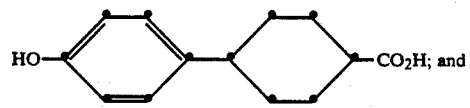

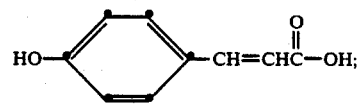

wherein substantially all of said hydroxy acid residues are located at the ends of the polymer chains to which they are attached;

and wherein said curable polyester, if having an acid number of 40 or less, is modified by treatment with a polybasic acid to yield a modified curable polyester having an acid number of about 40 to 70, followed by treatment of the curable polyester or modified polyester with about 1 to about 4 weight percent of an amine;

(II) about 0 to about 10 weight percent of a water-miscible organic solvent;

(III) about 30 to about 70 weight percent of water; and (IV) about 5 to about 20 weight percent of a crosslinking agent.

15. A shaped or formed article coated with the cured enamel composition of claim 14.

16. An auto body or body part coated with the cured enamel composition of claim 14.

17. The composition of claim 14, further comprising one or more pigments.

18. The water-borne enamel composition of claim 14 further comprising one or more leveling, rheology, and flow control agents; flatting agents; pigment wetting and dispersing agents and surfactants; ultraviolet absorbers; ultraviolet light stabilizers; tinting pigments; defoaming and anti-foaming agents; anti-skinning agents; anti-flooding and anti-floating agents; fungicides and mildewicides; corrosion inhibitors; thickening agents; or coalescing agents.

* * * * *

UNITED STATES PATENT AND TRADEMARK OFFICE
CERTIFICATE OF CORRECTION

PATENT NO. : 5,245,002

DATED : September 14, 1993

INVENTOR(S) : Thauming Kuo

It is certified that error appears in the above-identified patent and that said Letters Patent is hereby corrected as shown below:

Column 17, Claim 1, line 56, please delete the formula

"  ; "

and insert the formula

—— 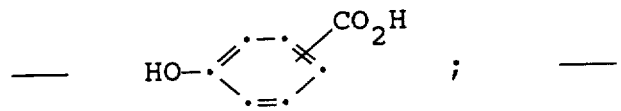 ; ——

Column 21, line 44, after "and" and before ";" please delete "(d)" and insert ——(e)——.

UNITED STATES PATENT AND TRADEMARK OFFICE
CERTIFICATE OF CORRECTION

PATENT NO. : 5,245,002
DATED : September 14, 1993
INVENTOR(S) : Thauming Kuo

It is certified that error appears in the above-identified patent and that said Letters Patent is hereby corrected as shown below:

Column 21, Claim 14, line 52, please delete the formula

"  ; "

and insert the formula

— 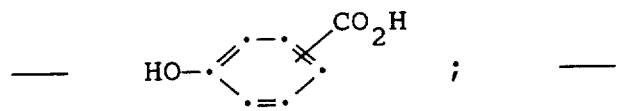 ; —

UNITED STATES PATENT AND TRADEMARK OFFICE
CERTIFICATE OF CORRECTION

PATENT NO. : 5,245,002
DATED : September 14, 1993
INVENTOR(S) : Thauming Kuo

It is certified that error appears in the above-indentified patent and that said Letters Patent is hereby corrected as shown below:

Column 22, line 62, after "agents:" and before "anti-skinning" please insert ——anti-settling, anti-sag and bodying agents;——.

Signed and Sealed this

Nineteenth Day of April, 1994

Attest:

BRUCE LEHMAN

Attesting Officer

Commissioner of Patents and Trademarks